United States Patent [19]

Broadt

[11] 4,379,323
[45] Apr. 5, 1983

[54] REFLECTOR INSERT FOR MULTI-FLASH UNIT

[75] Inventor: David R. Broadt, Lewisburg, Pa.

[73] Assignee: GTE Products Corporation, Stamford, Conn.

[21] Appl. No.: 221,073

[22] Filed: Dec. 29, 1980

[51] Int. Cl.³ .............................................. F21V 7/00
[52] U.S. Cl. ..................................... 362/346; 362/16; 362/11
[58] Field of Search ................... 431/359; 362/11, 13, 362/15, 16, 241, 247, 341, 345, 346, 348, 375

[56] References Cited
U.S. PATENT DOCUMENTS 3,956,625  5/1976  Anderson ............................ 431/359
4,155,110  5/1979  Armstrong et al. .................. 362/16
4,186,424  1/1980  Fohl .................................... 362/13
4,243,371  1/1981  Kewley et al. ................. 431/359 X
4,257,764  3/1981  Rainone ............................. 431/359
4,306,855  12/1981  Brower et al. ..................... 431/359
4,326,242  4/1982  Broadt et al. ........................ 362/11

Primary Examiner—Samuel Scott
Assistant Examiner—Margaret A. Focarino
Attorney, Agent, or Firm—Thomas H. Buffton

[57] ABSTRACT

A reflector unit for a relatively rigid housing member of a multi-lamp photoflash unit includes a plurality of cavities having a back surface formed to nest in the cavities of the housing member and a front surface having reflector material thereon and formed to receive a flashlamp.

12 Claims, 3 Drawing Figures

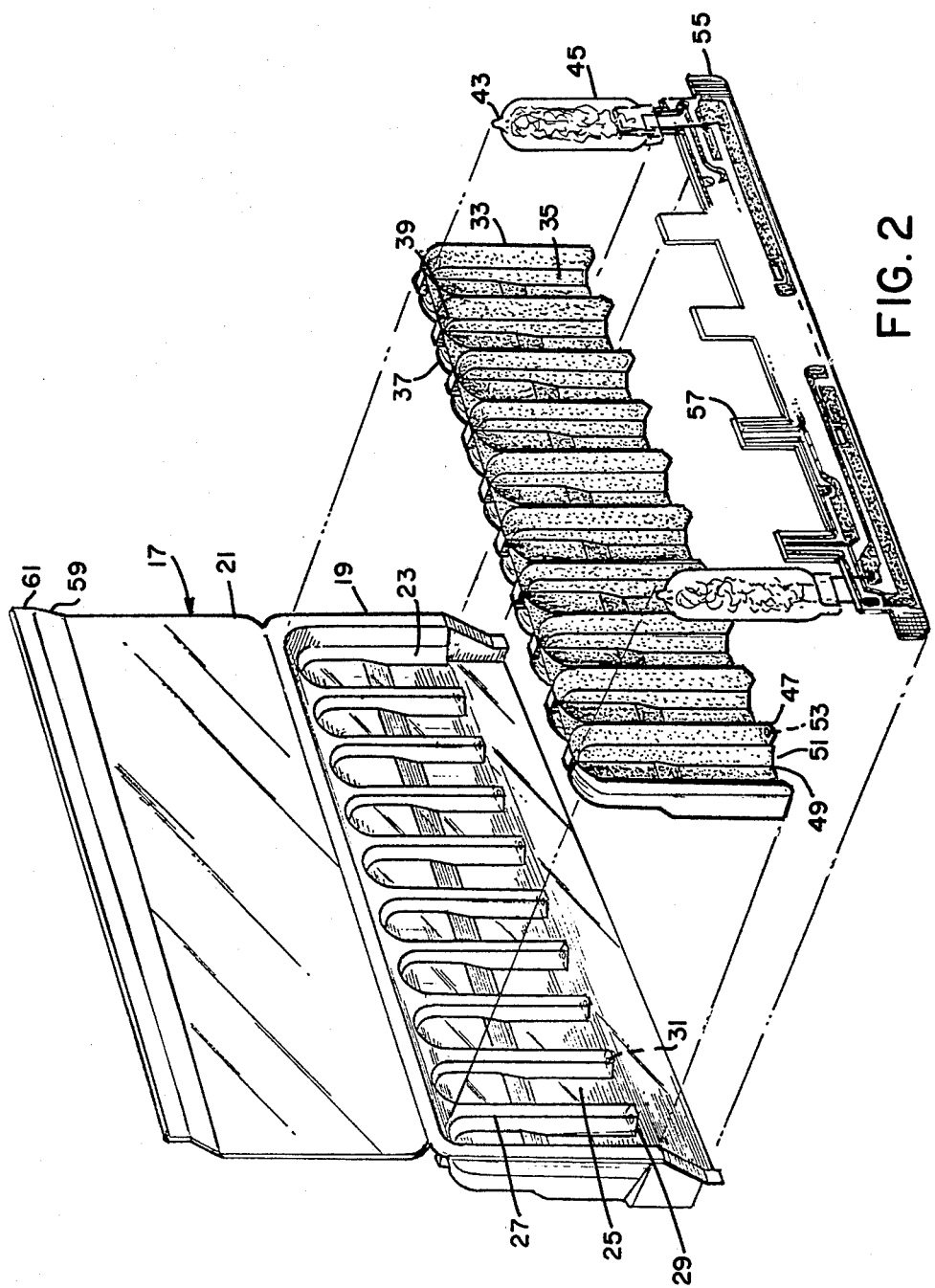

REFLECTOR INSERT FOR MULTI-FLASH UNIT

CROSS REFERENCE TO OTHER APPLICATIONS

A concurrently filed application bearing U.S. Ser. No. 221,074 now U.S. Pat. No. 4,373,906, has been filed in the name of James L. Holmes and entitled "Multi-lamp Photoflash Unit and Fabricating Process". Also, a concurrently filed application bearing U.S. Ser. No. 221,132, now U.S. Pat. No. 4,355,971 has been filed in the names of David R. Broadt and John W. Shaffer and is entitled "Vented Multi-lamp Photoflash Unit".

TECHNICAL FIELD

This invention relates to multi-lamp photoflash units and more particularly to a reflector unit formed to nest within a housing member and receive a flashlamp therein.

BACKGROUND ART

Generally, multi-lamp photoflash units may be characterized as either cube or linear configurations. Cube configurations are best illustrated by the flashcube of U.S. Pat. Nos. 3,327,105 or the magicube of 3,730,669. Linear configurations are set forth and described by the flashbar of U.S. Pat. Nos. 3,857,667 or the flip flash of 4,017,728.

In the above-mentioned cube configurations, a reflector is folded into a cube-like shape and includes a plurality of reflective surfaces each disposed at an angle of 90° to the reflective surface adjacent thereto. On the other hand, a linear configuration is usually in the form of a series of cavities which are folded to provide a back-to-back relationship and the complete unit is disposed within a relatively flat and rigid container or housing member. In an alternative format, the series of cavities may all face in one direction and be disposed within a relatively rigid housing member or the housing member itself may include a plurality of aligned cavities formed to receive flashlamps as set forth in a co-pending application bearing U.S. Ser. No. 221,132.

Although the above-described reflector structures have been and still are utilized in numerous applications, it has been found that there are other applications wherein the above-described structures leave something to be desired. For example a cube-like configuration seriously limits the available space suitable to a multiplicity of flashlamps. Similarly, cavities folded into a back-to-back configuration are also self-limiting insofar as space utilization is concerned. Moreover, the inclusion of a separate reflector unit in a multi-lamp photoflash unit tends to desirably reduce undesired heat transfer from a flashing lamp to an adjacent cavity.

SUMMARY OF THE INVENTION

An object of the present invention is to provide an improved multi-lamp photoflash unit which includes an enhanced reflective unit. Another object of the invention is to improve the reflective capabilities of a multi-lamp photoflash unit. Still another object of the invention is to reduce the space requirements and heat transfer characteristics of a reflective unit for a multi-lamp photoflash unit.

These and other objects, advantages and capabilities are achieved in one aspect of the invention by a reflector unit having a plurality of spaced cavities with each cavity having a back surface formed to nest in a cavity of a housing member and a front surface with a reflective surface and formed to receive a photoflash lamp.

BRIEF DESCRIPTION OF THE DRAWINGS

FIG. 2 is an exploded view of a photoflash unit including an embodiment of the reflector unit of the invention.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
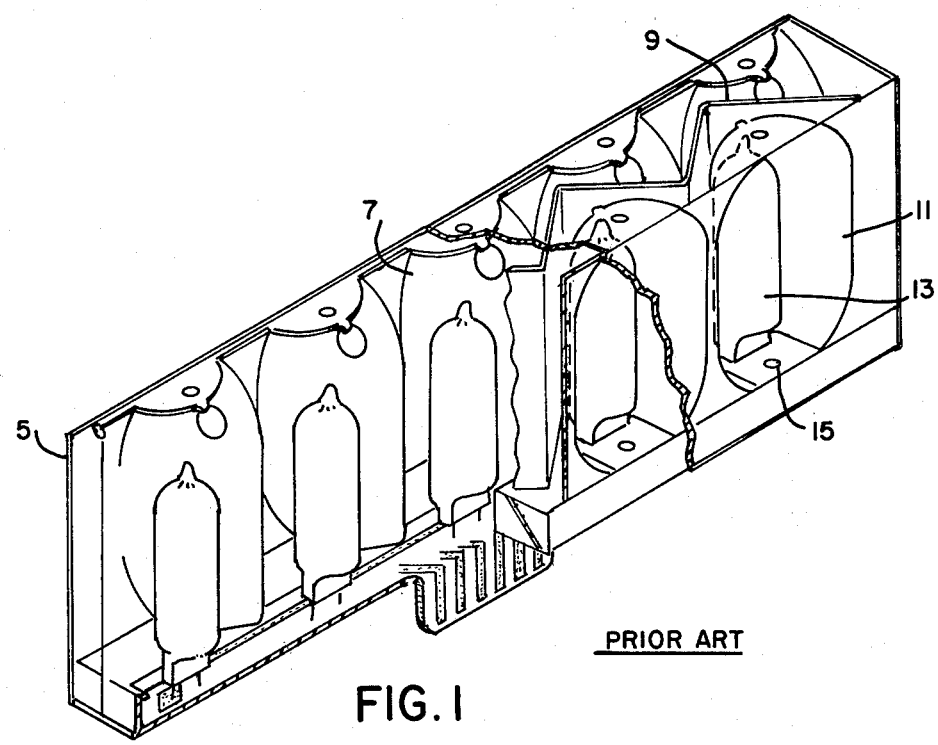
FIG. 1 is a prior art form of reflective unit for a multi-lamp photoflash unit.

Referring to the drawings, FIG. 1 illustrates a prior art form of multi-lamp photoflash unit. Therein, a relatively rigid housing member 5, of a polycarbonate material for example, encloses a plurality of spaced cavities 7 which are arrayed in rows and in a back-to-back relationship. A folded divider 9 separates the rows of spaced cavities 7 and each of the cavities 7 has a reflective surface 11 and is formed to receive a flashlamp 13. Also, a venting aperture 15 as well as a flashlamp 13 are located within each one of the cavities 7. Thus, the venting aperture 15 provides a direct passageway from the cavity 7 within to the exterior of the housing member 5. Obviously, a direct path or passageway for flashlamp fragments or particles leaves something to be desired.

Figure 3:
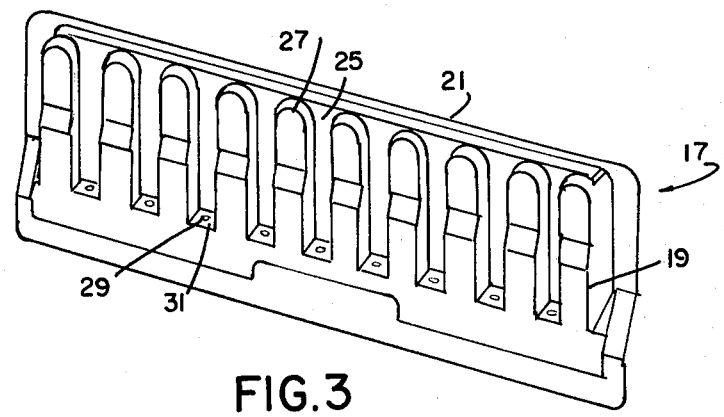
FIG. 3 is a rear elevational view of a housing member for a reflective unit.

Referring to FIGS. 2 and 3, a preferred form of multi-lamp photoflash unit includes a housing member 17, of a vacuum deformable material such as a 0.015-inch sheet of polycarbonate material, having back and front portions 19 and 21 respectively. The back portion 19 includes a plurality of cavities 23, aligned in a single plane and direction in this embodiment, with each pair of cavities 23 having a junction 25 therebetween which tapers to a spaced apart location 27. The cavities 23 each have longitudinal axis and these axes are in parallel relationship in accordance with the parallel relationship of the cavities 23.

A substantially planar surface 29 is disposed intermediate each pair of the cavities 23 and normal to the longitudinal axes of the cavities 23. This planar surface 29 extends from the junction 25 to the spaced apart location 27 of each pair of the cavities 23. A venting aperture 31 is disposed at and passes through at least one and preferably all of the planar surfaces 29. As can be clearly seen in FIG. 3, the venting apertures 31 are at the planar surface 29 intermediate each pair of cavities 23 and provide a passageway to the exterior of the housing member 17.

Formed for inclusion within the housing member 17 is a reflector unit 33. This reflector unit 33 is preferably formed from a relatively thin sheet of polycarbonate material, such as 0.010-inch material for example, and includes a plurality of reflector cavities 35. Each of the reflector cavities 35 has a back portion 37 which is configured such that the reflector cavities 35 nest within the cavities 23 of the housing member 17.

Also, each of the reflector cavities 35 has a front portion 39 which is covered with a reflective material such as aluminum, for example. This front portion 39 of each of the cavities 35 has a notch 41 therein which is formed to receive the tip portion 43 of a flashlamp 45. Thus, a flashlamp 45 is disposed within each of the reflector cavities 35 whereon a reflective material has been provided.

Each and preferably every pair of the reflector cavities 35 has a junction 47 therebetween which tapers to a spaced apart portion 49 at the back portion 37 of the reflector unit 33. The reflector cavities 35 all have a longitudinal axis and a planar surface 51 extends normal to this longitudinal axis from the junction 47 at the front portion 39 to the spaced apart portion 49 at back portion 37 of each pair of the reflector cavities 35. Moreover, the planar surfaces 51 of the reflector unit 33 are coincident with and contacting the planar surfaces 29 of the housing member 17.

Disposed within at least one and preferably each one of the planar surfaces 51 is a venting aperture 53. This venting aperture 53 of the reflector unit 33 is aligned with the venting aperture 31 of the housing member 17. Thus, the aligned venting apertures 53 and 31 respectively form a passageway for venting the multiple reflector cavities 35 exterior to the housing member 17. Significantly, this passageway is not a direct path from interior of the reflector cavities 35 to the exterior of the housing member 17 but rather provides an indirect path whereby the reflector cavities 35 are vented.

Additionally, a printed circuit board 55 with attached flashlamps 45 includes finger-like extensions 57 which are formed to nest in the reflector cavities 35. Also, the front portion 21 of the housing member 17 includes a tapered portion 59 and a flattened portion 61. This front portion 21 of the housing member 17 is folded and encloses the flashlamps 45 within the reflector cavities 35. Also, the tapered portion 50 accommodates the connections of the flashlamps 45 and the venting apertures 53 while leading to the flattened portion 61. Moreover, this flattened portion 61 sandwiches the printed circuit board 55 to the back portion 19 of the housing member 17 and provides a seal for the enclosure of the reflector cavities 35.

While there has been shown and described what is at present considered the preferred embodiments of the invention, it will be obvious to those skilled in the art that various changes and modifications may be made therein without departing from the scope of the invention as defined by the appended claims.

INDUSTRIAL APPLICABILITY

A reflector unit is formed from a thin sheet of a material such as polycarbonate to provide a plurality of cavities configured to nest in the cavities of a housing member. This separate reflector unit is coated on at least one side with a reflective material and is formed to receive a flashlamp in one of the reflective cavities.

This separate reflector unit is especially adapted to a vacuum-forming technique and is therefore economical to manufacture and is also economical of space and materials. Also, the separate reflector unit provides a reduced amount of heat transfer from a cavity wherein a lamp is flashed to an adjacent cavity due to the increased walls therebetween. Thus, a relatively thin material is applicable for the reflector unit and the light output in one cavity is not deleteriously affected because of heat generated from a flashing lamp in another cavity since the surface reflectivity of the cavities is not reduced by heat transfer from one cavity to another.

It is claimed:

1. In a multi-lamp photoflash unit having a housing member with a back portion with a plurality of spaced cavities, each contoured to receive a flashlamp and a light transmitting front portion formed to fold over and enclose said flashlamps within said cavities, the improvement comprising a reflector unit having a plurality of spaced cavities with each cavity having a back surface contoured to nest within one of said spaced cavities of said back portion of said housing member and a front surface covered with a light reflective material and formed to receive a flashlamp.

2. The multi-lamp photoflash unit of claim 1 wherein each cavity of said reflector unit includes a longitudinal axis and a planar surface is disposed intermediate each pair of said cavities and normal to said longitudinal axes with a venting aperture in at least one of said planar surfaces.

3. The multi-lamp photoflash unit of claim 1 said plurality of spaced cavities of said reflector unit are aligned in a single plane and a single direction.

4. The multi-lamp photoflash unit of claim 1 wherein each pair of said plurality of spaced cavities of said reflector unit includes a jointure portion and a spaced portion with a planar surface extending intermediate each of said jointure and spaced portions.

5. The multi-lamp photoflash unit of claim 1 wherein said reflective unit includes a plurality of cavities having a back surface contoured to nest within said spaced cavities of said housing member and front surface covered with a light reflective material and formed to receive a flashlamp with said front portion of said multi-lamp photoflash unit folding over and enclosing said flashlamps and spaced cavities of said reflective unit.

6. The multi-lamp photoflash unit of claim 1 wherein said reflective unit includes a plurality of cavities with a space intermediate each pair of said cavities and a planar surface in a plane normal to the longitudinal axes of said cavities and intermediate each pair of said cavities, said planar surface formed to receive an aperture for venting said cavities to the atmosphere external of said cavities.

7. A reflector unit for a multi-lamp photoflash unit having a housing member with a back portion having a plurality of spaced cavities and a front portion formed to fold over and enclose said cavities, said reflector unit having a plurality of spaced cavities each having a back portion contoured to nest within a cavity of said housing member and a front portion with a reflective surface and formed to receive a flashlamp.

8. The reflective unit of claim 7 wherein each pair of said plurality of spaced cavities includes a jointure portion and a spaced portion therebetween.

9. The reflective unit of claim 7 wherein each pair of said plurality of spaced cavities includes jointure and spaced portions and a planar surface normal to the longitudinal axes of said cavities and extending intermediate said jointure and spaced portions.

10. The reflective unit of claim 9 wherein said planar surface is formed to receive an aperture whereby venting of the cavities of the reflector unit is provided.

11. The reflector unit of claim 10 wherein said front portion of said housing member of said photoflash unit folds over and encloses said cavities of said reflector unit and said planar surface formed to receive an aperture for venting.

12. The reflector unit of claim 10 wherein said cavities of said reflector unit each include a notch formed to receive the tip of a flashlamp.

* * * * *